US012444233B2

(12) United States Patent
Lee et al.

(10) Patent No.: US 12,444,233 B2
(45) Date of Patent: Oct. 14, 2025

(54) MONITORING APPARATUS

(71) Applicant: HANWHA TECHWIN CO., LTD., Seongnam-si (KR)

(72) Inventors: Sang Yun Lee, Seongnam-si (KR); Hyun Kyu Park, Seongnam-si (KR); Ho Jung Lee, Seongnam-si (KR); Hye Lyoung Choi, Seongnam-si (KR)

(73) Assignee: Hanwha Vision Co., Ltd., Seongnam-si (KR)

( * ) Notice: Subject to any disclaimer, the term of this patent is extended or adjusted under 35 U.S.C. 154(b) by 460 days.

(21) Appl. No.: 17/568,722

(22) Filed: Jan. 5, 2022

(65) Prior Publication Data
US 2022/0215687 A1 Jul. 7, 2022

(30) Foreign Application Priority Data
Jan. 7, 2021 (KR) .......... 10-2021-0001929

(51) Int. Cl.
*G06F 16/535* (2019.01)
*G06F 16/538* (2019.01)
*G06T 7/55* (2017.01)
*G06V 40/16* (2022.01)

(52) U.S. Cl.
CPC .......... *G06V 40/173* (2022.01); *G06F 16/535* (2019.01); *G06F 16/538* (2019.01); *G06T 7/55* (2017.01); *G06V 40/166* (2022.01)

(58) Field of Classification Search
None
See application file for complete search history.

(56) References Cited

U.S. PATENT DOCUMENTS

| 9,311,522 B2* | 4/2016 | Lee ............... G06V 40/161 |
| 10,120,536 B2* | 11/2018 | Cha ............... G06F 3/0483 |
| 2005/0146606 A1* | 7/2005 | Karsenty ......... G08B 13/19656 348/143 |
| 2010/0220978 A1* | 9/2010 | Ogikubo ............ G06F 16/7864 345/660 |

(Continued)

FOREIGN PATENT DOCUMENTS

| JP | 2011223326 A | * 11/2011 | ....... G06F 17/30256 |
| JP | 2018151840 A | * 9/2018 | |

(Continued)

OTHER PUBLICATIONS

Vaquero, D. A., Feris, R. S., Tran, D., Brown, L., Hampapur, A., & Turk, M. (2009). Attribute-based people search in surveillance environments. 2009 Workshop on Applications of Computer Vision (WACV), 1-8. https://doi.org/10.1109/WACV.2009.5403131 (Year: 2009).*

*Primary Examiner* — Amandeep Saini
*Assistant Examiner* — Caroline Tabancay Duffy
(74) *Attorney, Agent, or Firm* — McLean IP Global; Jason Y. Pahng

(57) ABSTRACT

A monitoring apparatus includes a processor, wherein the processor provides a plurality of images to a first area of the user interface, generates an event image and a representative image from an image in which a set event is detected from among the plurality of images, and provides an event window in which the representative image is displayed in a second area, and the event image is automatically reproduced near the image from which the event is detected in the first area.

15 Claims, 19 Drawing Sheets

(56) References Cited

U.S. PATENT DOCUMENTS

| | | | | |
|---|---|---|---|---|
| 2012/0323891 A1* | 12/2012 | Jacobson | ................ | G06F 16/48 |
| | | | | 707/E17.014 |
| 2016/0005281 A1* | 1/2016 | Laska | ................ | G08B 13/1961 |
| | | | | 348/143 |
| 2017/0177287 A1* | 6/2017 | Jeong | ..................... | H04N 7/181 |
| 2017/0351906 A1* | 12/2017 | Oguchi | ............ | G08B 13/19682 |
| 2019/0268537 A1* | 8/2019 | Jang | ..................... | G06V 40/172 |

FOREIGN PATENT DOCUMENTS

| | | | |
|---|---|---|---|
| KR | 10-1352999 | B1 | 2/2014 |
| KR | 10-1482755 | B1 | 1/2015 |
| KR | 10-1964683 | B1 | 4/2019 |
| KR | 102039279 | B1 * | 10/2019 |
| KR | 10-2092074 | B1 | 3/2020 |
| KR | 10-2020-0127711 | A | 11/2020 |

\* cited by examiner (a)

MONITORING APPARATUS

CROSS-REFERENCE TO RELATED APPLICATION

This application is based on and claims priority under 35 U.S.C. § 119 to Korean Patent Application No. 10-2021-0001929, filed on Jan. 7, 2021, in the Korean Intellectual Property Office, the disclosure of which is incorporated by reference herein in its entirety.

BACKGROUND

1. Field

One or more embodiments include a security system including a camera and a monitoring apparatus.

2. Description of the Related Art

For personal and public safety, a security system that collects and records images obtained from cameras installed in various places such as roads and buildings in real time and detects events is utilized.

SUMMARY

One or more embodiments include a security system capable of intuitively notifying a user of an event occurrence when an event occurs.

Additional aspects will be set forth in part in the description which follows and, in part, will be apparent from the description, or may be learned by practice of the presented embodiments of the disclosure.

According to one or more embodiments, a monitoring apparatus includes: a processor which processes a plurality of images received from a plurality of channels and generate a user interface; a storage device which stores the plurality of images; and a display which displays the plurality of images on the user interface, wherein the processor provides the plurality of images to a first area of the user interface, generates an event image and a representative image from a first image from which an event is detected from among the plurality of images, and provides an event window in which the representative image is displayed in a second area, and attribute information extracted by analysis of the first image is displayed in the event window of the second area.

In an embodiment, the processor may enlarge and display the first image over the entire first area, and may synthesize and display past images of the same person or face near the person or face detected from the first image.

The past image may be a past event image from which the same person or face is detected or a still image of a person or face extracted from the past event image.

Size of the still image of the person or face may vary in proportion to the size of the person or face detected from the first image.

In an embodiment, the processor may automatically reproduce the event image, in the first area, near the first image.

In an embodiment, the processor may provide a reproduction menu in the event window, and may reproduce the event image, in the first area, near the first image, in response to a selection of the reproduction menu.

The first image in which the event is detected may be an image which is received through a set channel from among the plurality of channels and from which an event is detected or an image from which a preset event is detected from among the plurality of images.

In an embodiment, the processor may provide a second image in which hovering of an input device is detected from among the plurality of images provided in the first area, with a reproduction control menu of the second image and a camera control menu of a channel providing the second image.

In an embodiment, the processor, when left or right sliding of the input device is detected from the representative image of the event window, may reproduce the event image backward or forward for a time period proportional to a length of the sliding.

In an embodiment, the processor may register the attribute information as a search keyword, and may dynamically change and provide a search option including the search keyword in response to a search request.

According to one or more embodiments, a monitoring method of a monitoring apparatus includes: generating an event image and a representative image from a first image from which an event is detected from among a plurality of images received from a plurality of channels; and providing the plurality of images in a first area of a user interface and providing an event window in which the representative image is displayed in a second area; and attribute information extracted by analysis of the first image is displayed in the event window of the second area.

In an embodiment, the monitoring method may include: enlarging and displaying the first image over the entire first area, and synthesizing and displaying, in an area around a person or face detected in the first image, past images of the same person or face.

The past image may be a past event image from which the same person or face is detected or a still image of a person or face extracted from the past event image.

Size of the still image of the person or face may vary in proportion to the size of the person or face detected from the first image.

In an embodiment, the monitoring method may include: automatically reproducing the event image, in the first area, near the first image.

In an embodiment, the monitoring method may include: providing a reproduction menu in the event window, and reproducing the event image, in the first area, near the first image, in response to a selection of the reproduction menu.

The first image in which the event is detected may be an image which is received through a set channel from among the plurality of channels and from which an event is detected or an image from which a preset event is detected from among the plurality of images.

In an embodiment, the monitoring method may include: providing a second image in which hovering of an input device is detected from among the plurality of images provided in the first area, with a reproduction control menu of the second image and a camera control menu of a channel providing the second image.

In an embodiment, the monitoring method may include: when left or right sliding of the input device is detected from the representative image of the event window, reproducing the event image backward or forward for a time period proportional to a length of the sliding.

In an embodiment, the monitoring method may include: registering the attribute information as a search keyword, and dynamically changing and providing a search option including the search keyword in response to a search request.

BRIEF DESCRIPTION OF THE DRAWINGS

The above and other aspects, features, and advantages of certain embodiments of the disclosure will be more apparent from the following description taken in conjunction with the accompanying drawings, in which:

FIGS. 12A to 13B are views for explaining image reproduction according to an embodiment; and FIGS. 14A to 14C are views for explaining an image search according to an embodiment.

DETAILED DESCRIPTION

Figure 1:
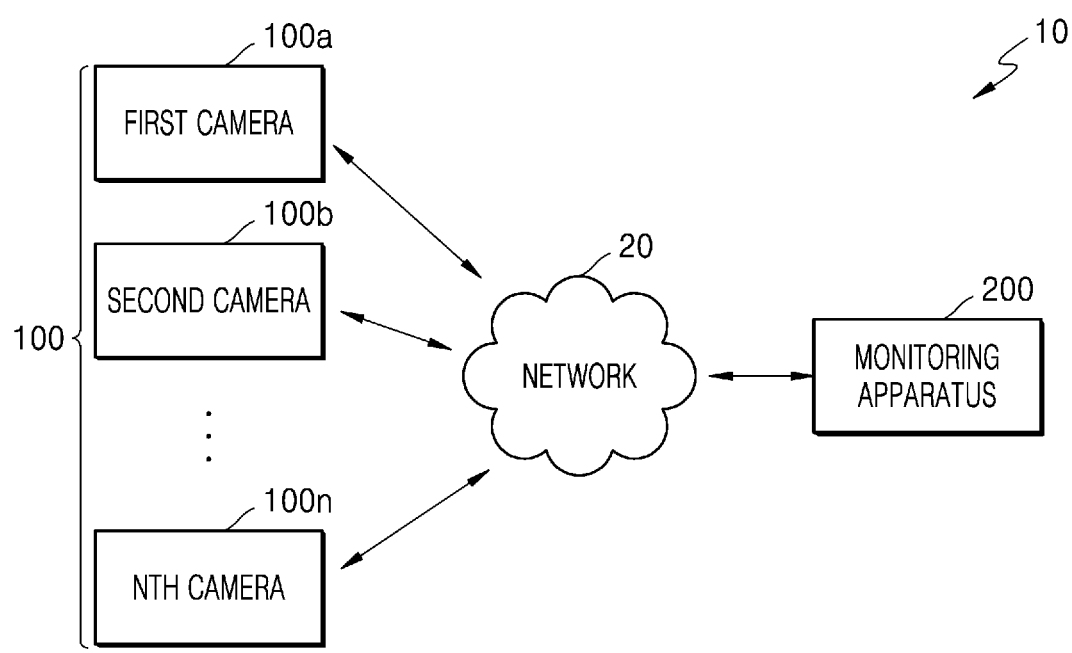
FIG. 1 is a configuration diagram of a security system according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

The following is merely illustrative of the principles of the disclosure. Therefore, those of ordinary skill in the art will be able to devise various devices that, although not explicitly described or shown herein, embody the principles of the disclosure and are included within the spirit and scope of the disclosure. In addition, all conditional terms and examples listed herein are, in principle, to be expressly intended only for the purpose of enabling the concept of the disclosure to be understood, and it is to be understood that they are not limited to the specifically enumerated embodiments and states as such. In addition, it is to be understood that all detailed description enumerating the principles, aspects, and embodiments of the invention, as well as specific embodiments, are intended to cover structural and functional equivalents of such matters. In addition, it is to be understood that such equivalents include both currently known equivalents as well as equivalents developed in the future, that is, all elements invented to perform the same function, regardless of structure.

Accordingly, the functions of the various elements illustrated in the figures including functional blocks denoted as processors or similar concepts may be provided by the use of dedicated hardware as well as hardware having the ability to execute software in association with appropriate software. When the elements are provided by a processor, the functions of the elements may be provided by a single dedicated processor, a single shared processor, or a plurality of separate processors, some of which may be shared. In addition, the use of terms presented as processor, control, or similar concepts should not be construed as referring exclusively to hardware having the ability to execute software, but should be construed to implicitly include, without limitation, digital signal processor (DSP) hardware or random access memory (RAM), read-only component (ROM), and non-volatile memory for storing software. Other commonly known hardware may also be included.

The above objects, features and advantages will become more apparent through the following detailed description in conjunction with the accompanying drawings. In the description of the disclosure, certain detailed explanations of the related art are omitted or briefly described when it is deemed that they may unnecessarily obscure the essence of the disclosure.

In addition, it will be understood that when a unit is referred to as "comprising" another element, it may not exclude the other element but may further include the other element unless specifically oppositely indicated.

Hereinafter, embodiments will be described in detail with reference to the accompanying drawings.

Figure 2:
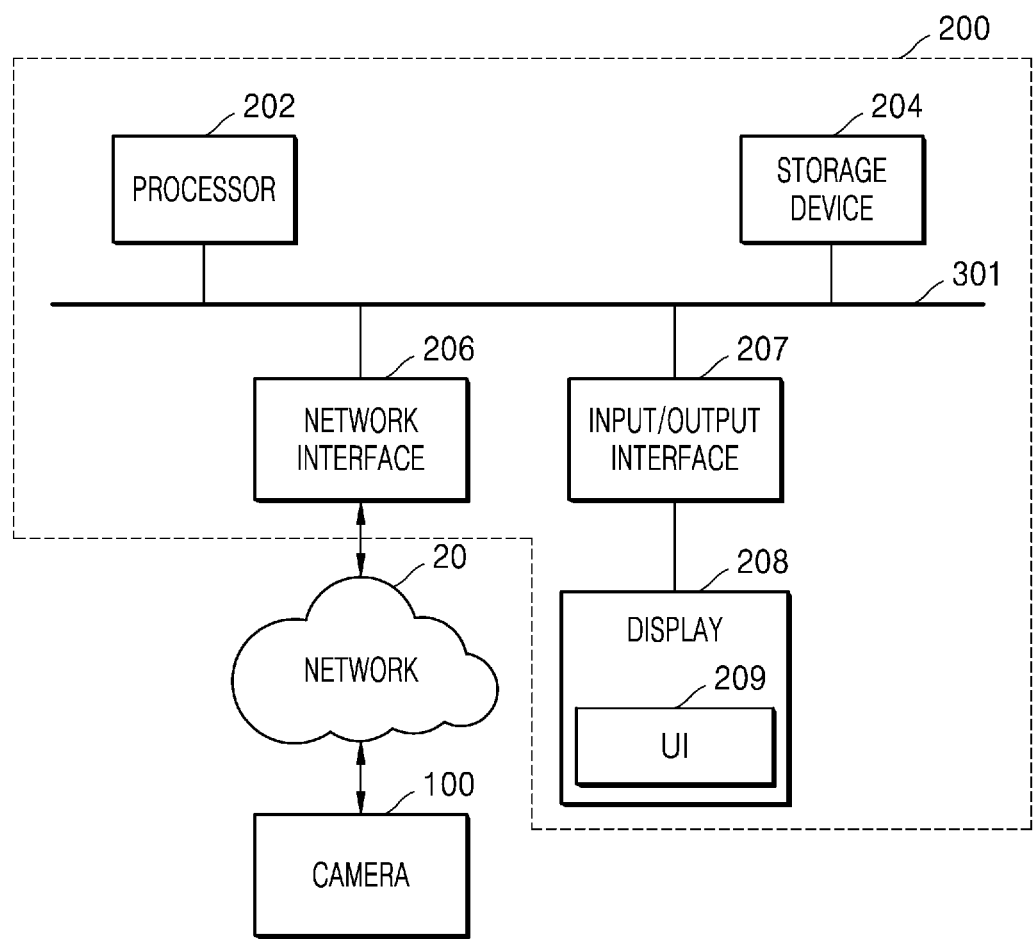
FIG. 2 is a configuration diagram of a monitoring apparatus of FIG. 1.

FIG. 1 is a configuration diagram of a security system according to an embodiment. FIG. 2 is a configuration diagram of a monitoring apparatus of FIG. 1.

Referring to FIG. 1, a security system 10 of the present embodiment may include a camera 100 and a monitoring apparatus 200. The camera 100 and the monitoring apparatus 200 may be connected to each other through a network 20 that is wired and/or wireless.

The network 20 may include wired networks such as Local Area Networks (LANs), Wide Area Networks (WANs), Metropolitan Area Networks (MANs), and Integrated Service Digital Networks (ISDNs), and wireless networks including wireless Internet such as 3G, 4G (LTE), 5G, Wi-Fi, Wibro, Wimax, etc. and short-distance communication including Bluetooth, Radio Frequency Identification (RFID), Infrared Data Association (IrDA), Ultra Wideband (UWB), ZigBee, and Near Field Communication (NFC). For wireless mobile communication, a communication network may further include components such as a base station (BTS), a mobile switching center (MSC), a home location register (HLR), an access gateway that enables transmission and reception of wireless packet data, a Packet Data Serving Node (PDSN), and the like. However, the scope of the disclosure but is not limited thereto.

The camera 100 may be a single stationary camera arranged at a fixed location in a specific place and having a fixed shooting range or a PTZ camera having a Pan/Tilt/Zoom function. The camera 100 may be a surveillance camera including a visual camera, a thermal camera, a special purpose camera, and the like. The camera 100 may include an image sensor such as a charge-coupled device (CCD) or a complementary metal oxide semiconductor (CMOS). The camera 100 may obtain image information by capturing a scene in a gaze direction.

The camera 100 is installed inside and outside offices, houses, hospitals, as well as in banks or public buildings requiring security, or outdoors, such as parks, and may have various shapes, such as a straight line or a dome type, according to the installation location and purpose of use.

The camera 100 may include first to $n^{th}$ cameras 100a to 100n. Each of the first to $n^{th}$ cameras 100a to 100n may capture an allocated monitoring area and transmit the captured image to the monitoring apparatus 200.

The monitoring apparatus 200 may receive an image from each of the first to $n^{th}$ cameras 100a to 100n. The monitoring apparatus 200 may include a central management system (CMS), a personal computer, a mobile device such as a smartphone, a tablet, and a handheld device, a server, or other types of computing devices.

The monitoring apparatus 200 may include a processor 202 and a storage device 204.

The processor 202 may be implemented with any number of hardware and/or software configurations that perform specific functions. For example, the processor 202 may refer to a data processing device embedded in hardware having a physically structured circuit to perform a function expressed as code or instructions in a program. As an example of the data processing device embedded in hardware as described above, a processing device such as a microprocessor, a central processing unit (CPU), a processor core, a multiprocessor, an application-specific integrated circuit (ASIC), and a field programmable gate array (FPGA) may be included, but the scope of the disclosure is not limited thereto.

The processor 202 may execute instructions (or software modules) recorded in a computer-readable storage medium such as the storage device 204. The computer-readable storage medium may store software modules implementing specific embodiments, and the processor 202 may execute the stored software modules. The processor 202 may generate a user interface (UI) 209 for communicating with a user, and provide and display the UI 209 on a display 208.

The storage device 204 may store a program for processing and controlling the processor 202, and may store input/output data (e.g., images, etc.) of the processor 202. The storage device 204 may include a memory configured as RAM, ROM, or a combination thereof. The storage device 204 may be a mass storage device including a hard disk drive, an optical disk drive, a solid-state drive (SSD), or the like. The processor 202 may store image and an image analysis result such as attribute information in the storage device 204.

In FIG. 2, the storage device 204 is illustrated as being implemented as a part of the monitoring apparatus 200, but in another embodiment, the storage device 204 may be separated from the monitoring apparatus 200 and connected to the network 20. In this case, the storage device 204 may include a digital video recorder (DVR) or a network video recorder (NVR). In addition, the storage device 204 may include a web storage, a cloud server, and the like that perform a storage function on the Internet.

The monitoring apparatus 200 may transmit setting data for setting functions and operations of the camera 100 to the camera 100 through a network interface 206. The network interface 206 may include a network interface card, a modem, and the like.

The monitoring apparatus 200 may include an input device and an output device connected thereto through an input/output interface 207. The input/output interface 207 may include a serial port, a parallel port, a game port, a USB port, and the like.

The input device may be connected to the processor 202 by wire or wirelessly to generate input data for controlling the processor 202. The input device may include a key pad, a dome switch, a touch pad (contact capacitance method, pressure resistance film method, infrared sensing method, surface ultrasonic conduction method, integral tension measurement method, piezoelectric effect method, etc.), a mouse, a remote control, a jog wheel, a jog switch, and the like. A user may input commands and/or information to the monitoring apparatus 200 using an input device.

The output device may include a speaker, a printer, the display 208, and the like. An execution result of the software modules by the processor 202 may be displayed on the display 208. The display 208 may be a liquid crystal display (LCD), an organic light emitting display (OLED), an electrophoretic display (EPD), or the like. The display 208 is provided as a touch screen to which a user's touch may be input, and may operate as an input device and an output device.

FIGS. 3 to 7 are views of the UI 209 provided by a monitoring apparatus according to an embodiment.

Figure 3:
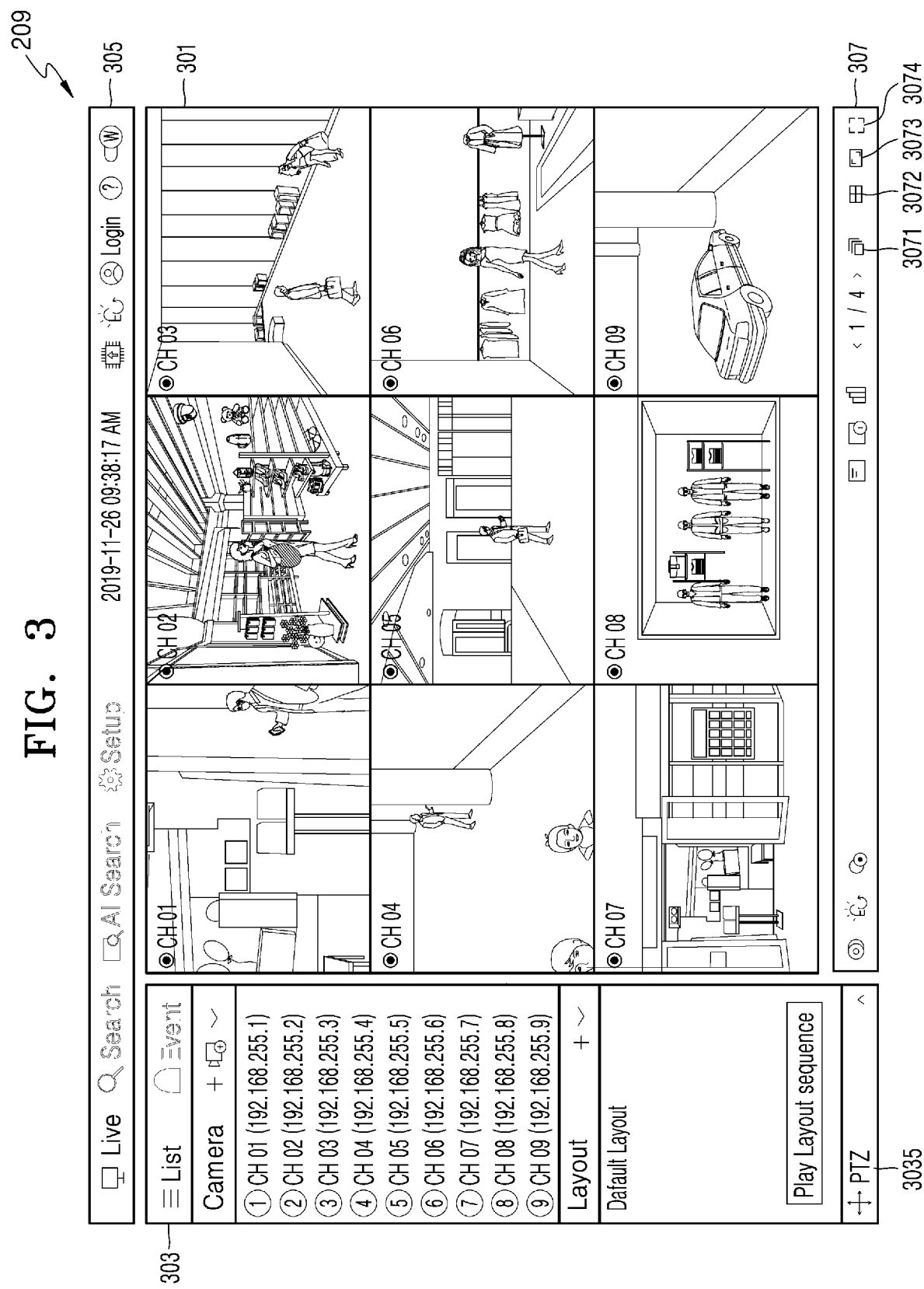
FIGS. 3 to 7 are views of a user interface (UI) provided by a monitoring apparatus according to an embodiment.

Referring to FIG. 3, the UI 209 provided by the processor 202 may include a first area 301 providing a live image of each of a plurality of channels and a second area 303 providing additional information of each channel.

The first area 301 is an area in which the live image of each of the plurality of channels is displayed, and the live image of each of the plurality of channels may be displayed in real time. The channel refers to a data transmission/reception path between a camera and the monitoring apparatus 200. For example, the first channel is a data transmission/reception path between a first camera installed in a first monitoring area and the monitoring apparatus 200, and an image obtained by the first camera may be displayed in the first area 301. FIG. 3 is an example in which nine images obtained from first to ninth cameras through nine channels are displayed for convenience of explanation and illustration. However, an embodiment of the disclosure is not limited thereto, and images from nine or more channels may be displayed in the first area 301.

A third area 305, in which login information and a main menu are provided, may be displayed at an upper end of the first area 301. The main menu may include a live menu (Live), a search menu (Search/AI Search), and a setup menu (Setup). A fourth area 307, in which a menu for controlling display of the first area 301 is provided, may be displayed at a lower end of the first area 301. For example, in the fourth area 307, a mode selection menu 3071 in which images for each channel are arranged to overlap each other, a layout selection menu 3072 in the first area 301, an aspect ratio (4:3, 16:9, etc.) view menu 3073 of images for each channel, and a full view menu 3074 may be provided. The layout selection menu 3072 is a menu for selecting a layout that is a division type of the first area 301. FIG. 3 illustrates an example in which a live image of each of nine channels is displayed in a layout in which the first area is divided into nine areas of the same size. In another embodiment, the first area may be changed to a layout divided into 5 areas of different sizes, and images of 5 channels selected by a user may be displayed in the 5 areas. The full view menu 3074 is a menu for mode switching in which the second to fourth areas 303, 305, and 307 disappear and the first area 301 is expanded and displayed on a display screen.

Figure 6:
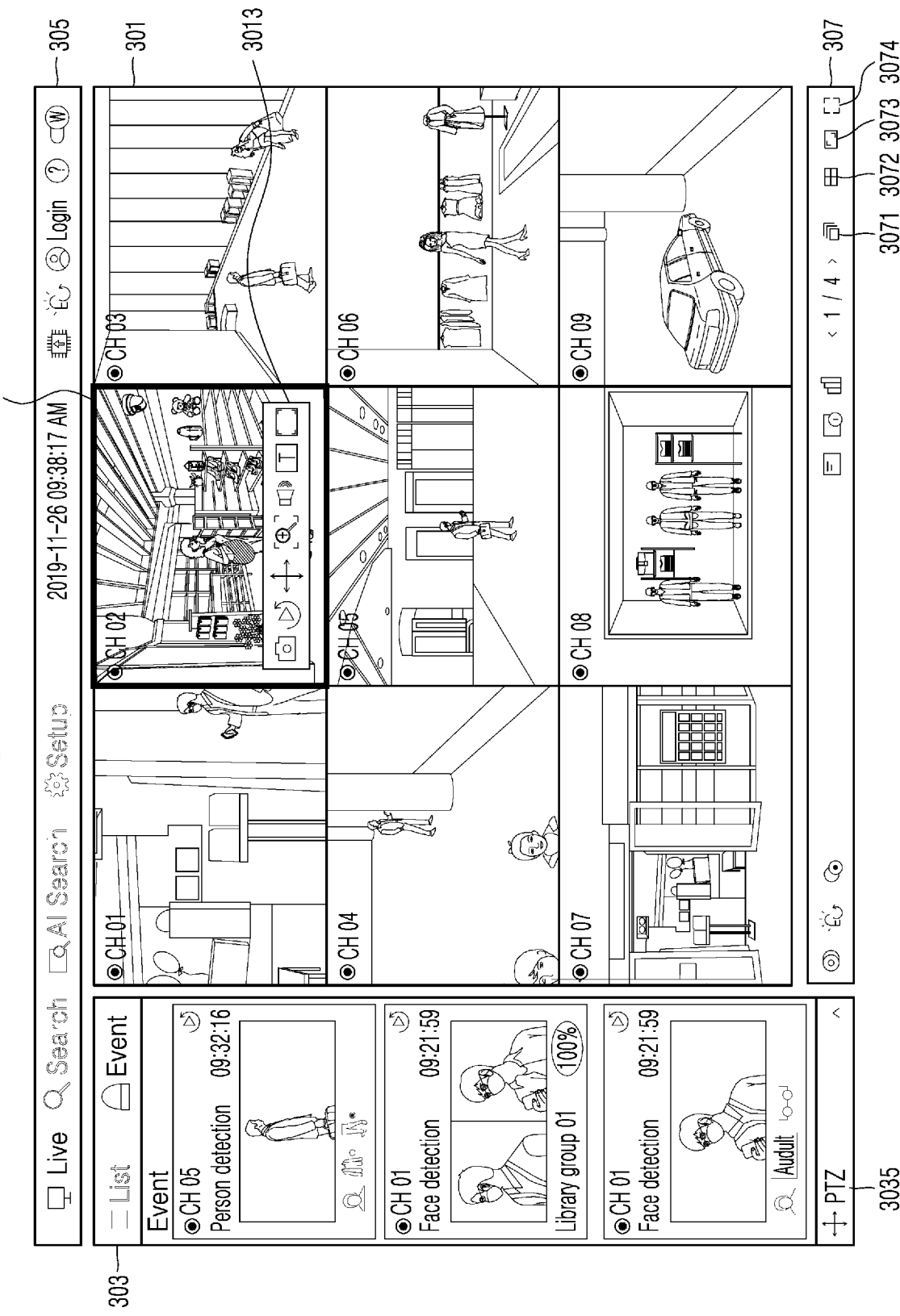

When a mouse approaches or hovers over a live image of one channel from among the live images displayed in the first area 301, certain menus for individually controlling the live image may be provided at the bottom of the live image. For example, as shown in FIG. 6, at the bottom of a live image 3011 over which a mouse hovers, an area 3013 in which menus for controlling the live image 3011 and a corresponding camera providing the live image 3011, such as a reproduction menu (a playback menu), a camera PTZ control menu, an audio control menu, and a screen enlargement menu, are provided may be displayed overlapping the live image 3011.

That is, in the embodiment of the disclosure, live images of all channels provided in the first area 301 may be controlled by a menu provided in the third area 305, and the live images may be individually controlled by a menu provided in the live image of the first area 301.

The second area 303 is an area in which information provided to a user according to a main menu selected in the third area 305 is displayed. When a live menu (Live) is selected in the third area 305, equipment information of each channel or event information occurring in each channel may be displayed in the second area 303. In the second area 303, a list window providing equipment information, for example, camera information, and an event window providing an event image may be selectively switched and displayed. The event image may be a video that may be reproduced for a predetermined period.

As shown in FIG. 3, when the list menu (List) is selected, a camera list for each channel and a layout list that may be set in the first area 301 may be displayed in the second area 303. A scroll bar is provided in the second area 303, so that the camera list and layout list provided in the second area 303 may be checked using the scroll bar.

Figure 4:
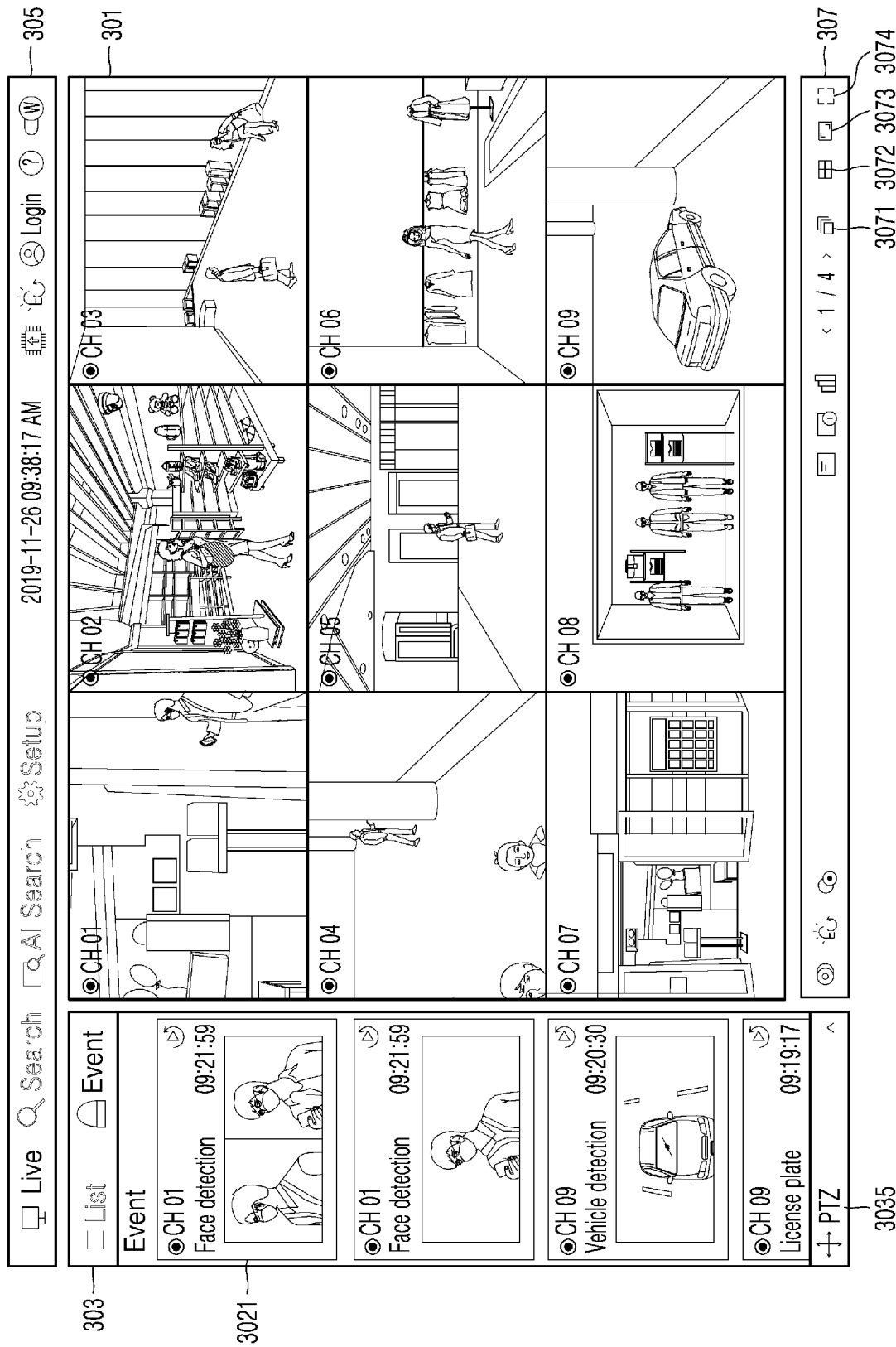

As shown in FIG. 4, when an event menu (Event) is selected, at least one event occurring in an image of each channel may be provided in the second area 303 in the form of a window in real time. In the second area 303, events may be provided in descending chronological order so that the latest event is displayed at the highest location. A scroll bar is provided in the second area 303 so that the events provided in the second area 303 may be checked using the scroll bar.

Figure 5A:
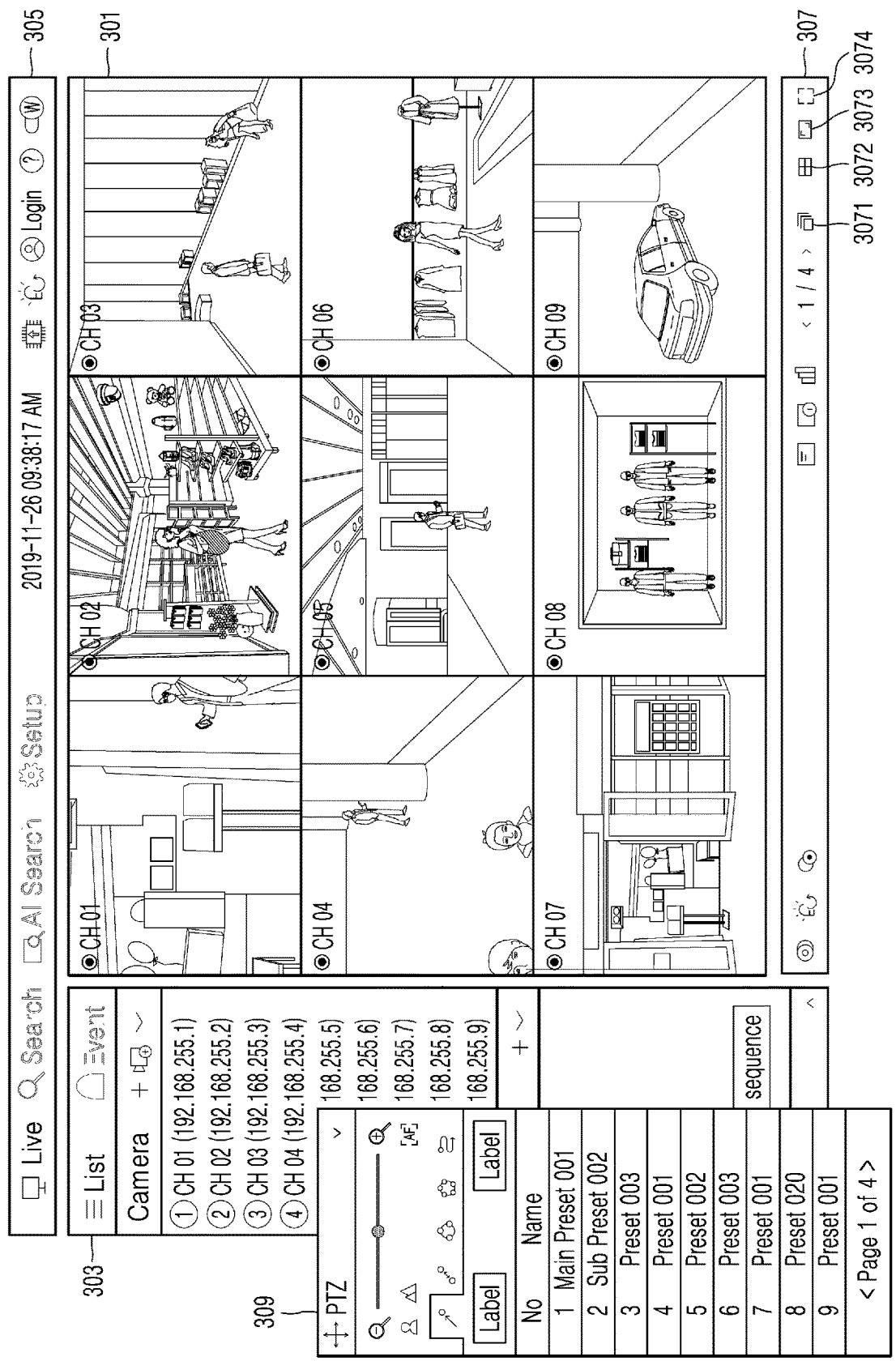
Figure 5B:
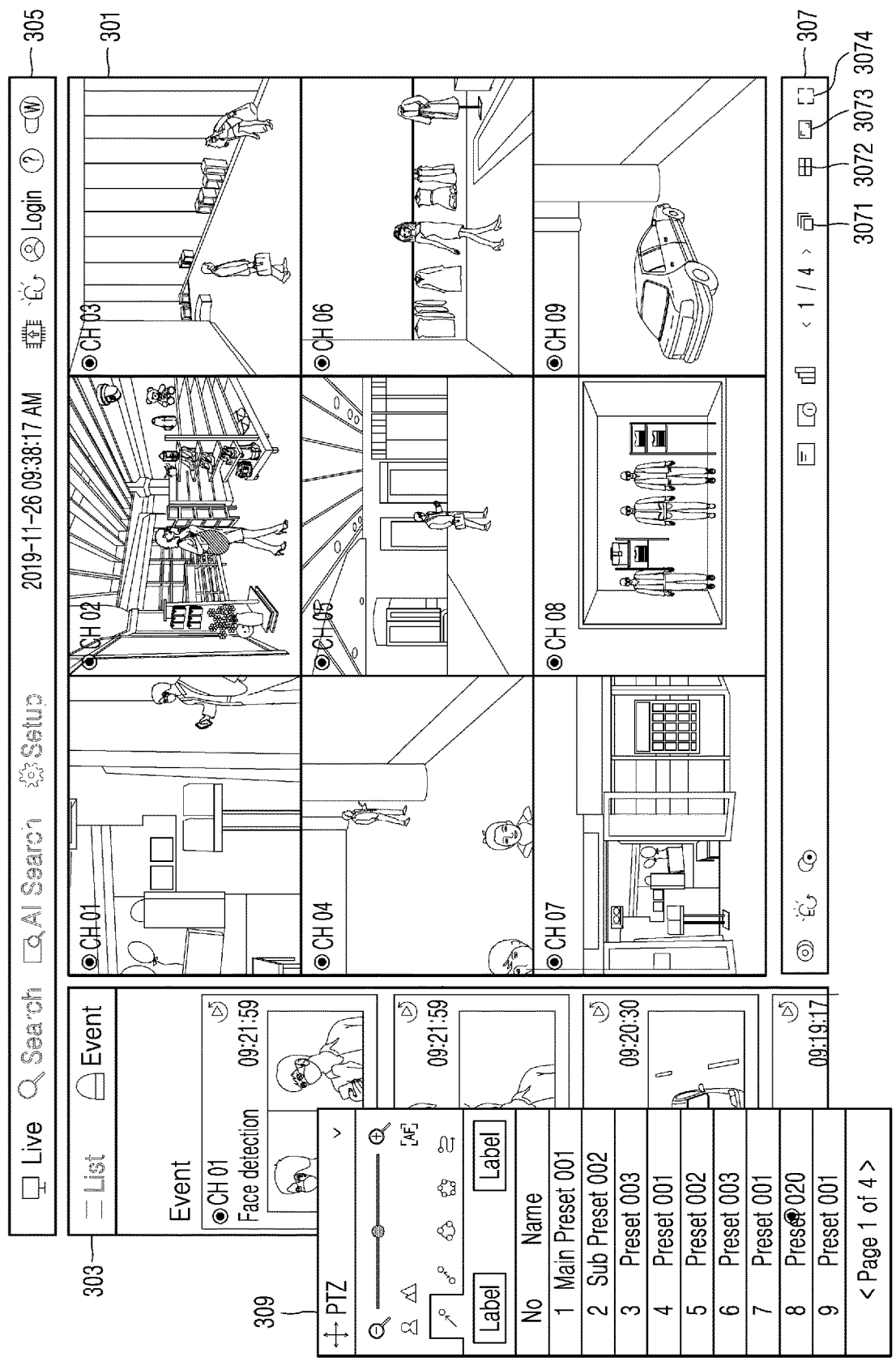

As shown in FIGS. 3 and 4, a PTZ menu 3035 may be provided at a lower end of the second area 303. When the PTZ menu 3035 is selected, as shown in FIGS. 5A and 5B, a pop-up window 309 providing preset information in which PTZ values for each camera are set may be displayed partially overlapping the second area 303. The PTZ menu 3035 may be a menu activated only when a PTZ camera is selected from the camera list provided in the second area 303 when the list menu (List) is selected, or when a camera that has captured an event selected from the event list provided in the second area 303 is a PTZ camera when the event menu (Event) is selected.

Figure 7:
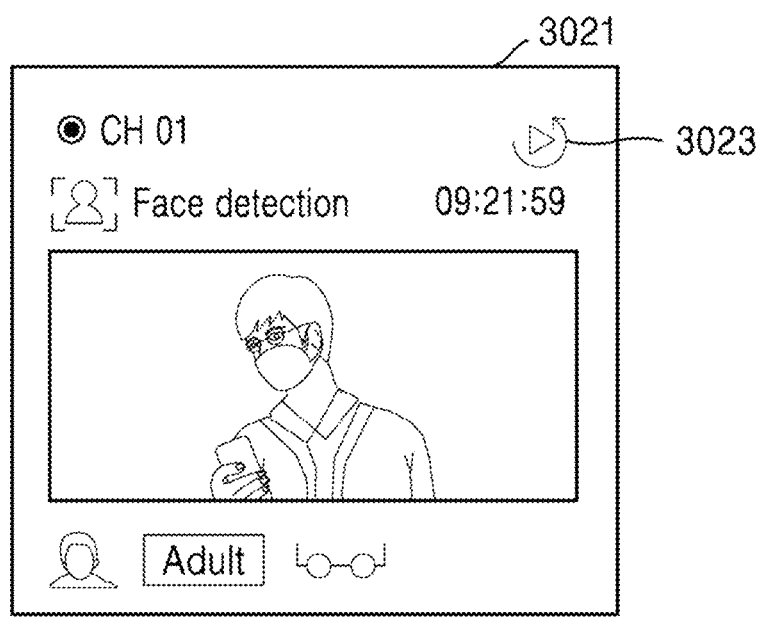

As shown in FIG. 7, event information such as an event occurrence channel, event occurrence time, event type, representative image, and attribute information (person, adult, gender, wearing glasses/mask, etc.) may be displayed on an event window 3021 provided in the second area 303. The representative image may be a thumbnail. A reproduction menu (playback menu) 3023 capable of reproducing an event image may be provided in the event window 3021. The attribute information may be information extracted through image analysis. The attribute information may be reflected in a search keyword provided to a user when searching for an image, as described later below. The processor 202 may register the attribute information as a search keyword and dynamically change and provide a search option including the search keyword in response to a search request. The storage device 204 may include a storage unit for storing an image and attribute information matched to the image, and a storage unit for storing information related to a search, such as a search keyword, and the processor 202 may store (register) all or part of the attribute information as a search keyword in the storage unit.

Figure 8:
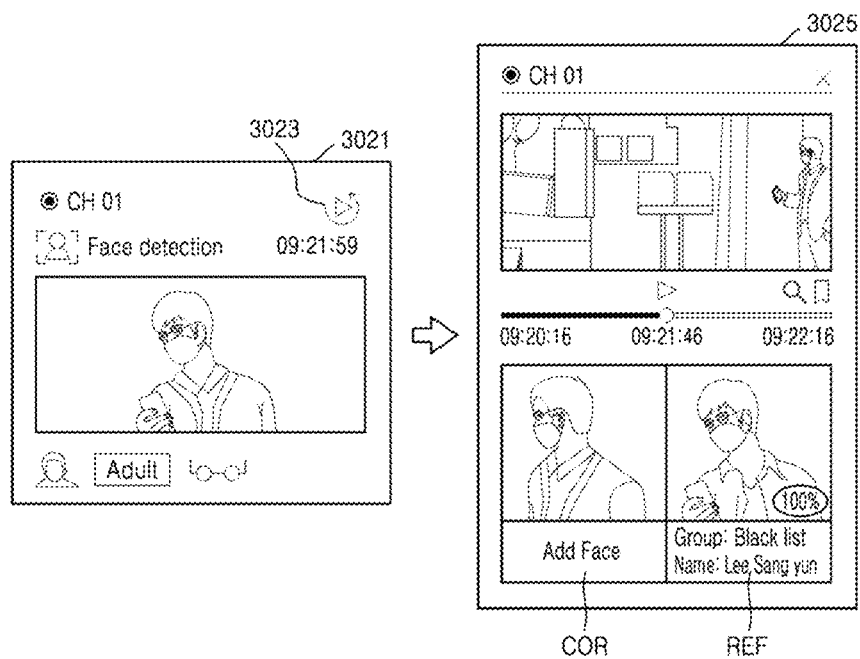
FIGS. 8 to 10 are views for explaining reproduction of an event image according to an embodiment.
Figure 9:
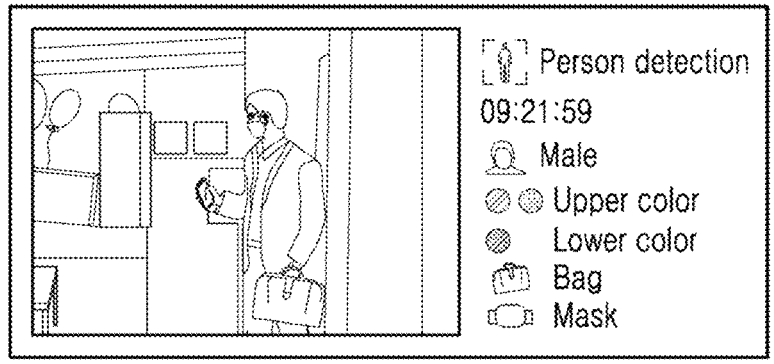
Figure 9:
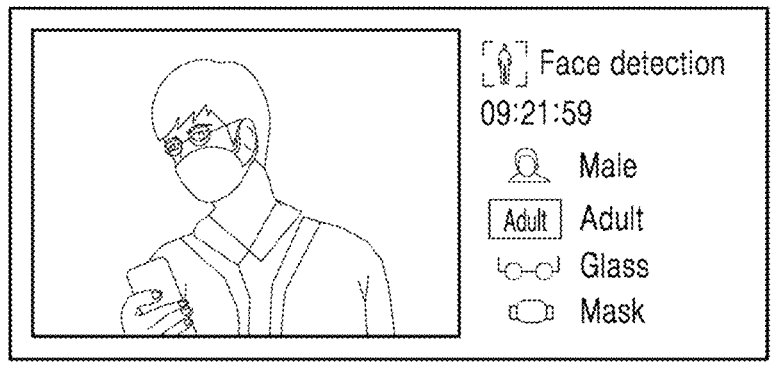
Figure 10:
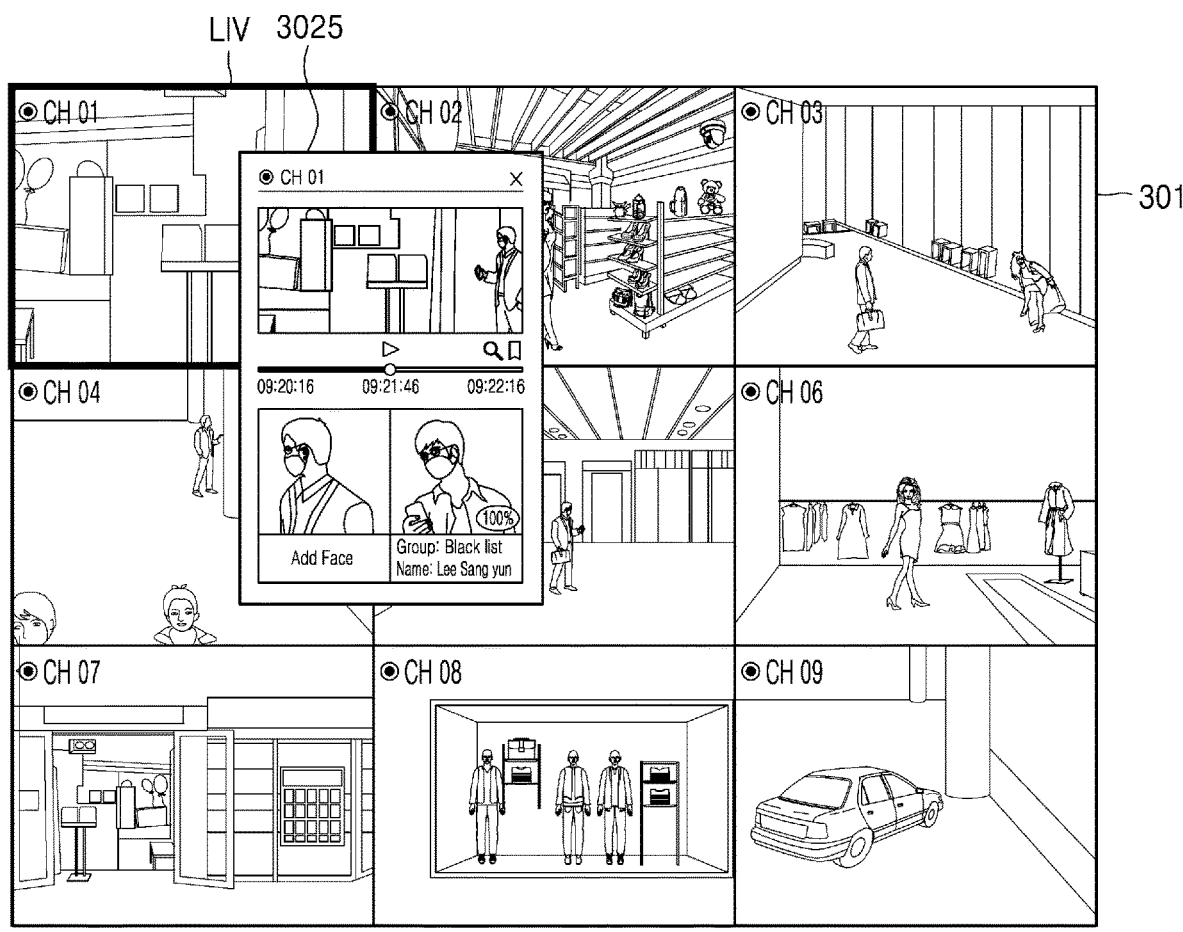

FIGS. 8 to 10 are views for explaining an event providing method according to an embodiment. FIGS. 8 to 10 may provide an event to a user through real-time reproduction of an event image.

Referring to FIG. 8, when an input for selecting the reproduction menu 3023 of the event window 3021 is received, as shown on the right side, a processor 201 may generate and provide a pop-up window 3025 in which an event image including a predetermined period before and after an event detection time is reproduced. A timeline may be provided at the bottom of the event image while the event image is being reproduced in the pop-up window 3025. In an embodiment, the event window 3021 may be converted into the pop-up window 3025. In another embodiment, the pop-up window 3025 may overlap the event window 3021. Various event information may be provided in the pop-up window 3025 according to an event type.

When an event being reproduced is an event matching the previously registered and stored reference image, as shown in FIG. 8, at the bottom of an event image of the pop-up window 3025, a reference image REF and a corresponding image COR extracted from an event image corresponding to the reference image REF may be provided together for comparison. A similarity between the reference image REF and the corresponding image COR may be displayed on the pop-up window 3025. FIG. 8 is an example in which a degree of similarity of 100% is displayed. The pop-up window 3025 may provide a menu (Add Face) for adding the corresponding image COR as a reference image. When the additional menu is selected, the corresponding image COR may be registered as a reference image. The corresponding image COR may be added while replacing the existing reference image or may be added as a new reference image. For example, when the similarity between the corresponding image COR and the reference image REF is high and the accuracy increases, a user may add the corresponding image COR to replace the existing reference image, and when the similarity between the corresponding image COR and the reference image REF is low, a user may add the corresponding image COR as a new reference image.

In an embodiment, as shown in FIG. 9 (*a*), if an event being reproduced is a human detection event, when a specific time point is selected in a timeline at the bottom of an event image being reproduced in the pop-up window 3025, a still image at the selected time point and various analysis information identified from the detected person, such as gender, clothing color, and whether or not a bag is possessed, may be provided in a separate window. The analysis information may be provided in various forms, such as characters, figures, and icons. In another embodiment, analysis information related to the still image at the selected time point may be provided in the pop-up window 3025.

As shown in FIG. 9 (*b*), if an event being reproduced is a face detection event, when a specific time point is selected in a timeline at the bottom of an event image being reproduced in the pop-up window 3025, a still image at the selected time point and various analysis information identified from the detected face, such as gender, age, and whether glasses/mask is worn, may be provided in a separate window. The analysis information may be provided in various forms, such as characters, figures, and icons.

In another embodiment, analysis information related to the still image at the selected time point may be provided in the pop-up window 3025.

When multiple events occur simultaneously on one object, the event information for each event shown in FIGS. 8, 9 (*a*), and 9 (*b*) may be all displayed in the pop-up window 3025 or in a separate window.

As shown in FIG. 10, the pop-up window 3025 that reproduces an event image may be displayed around a live image LIV of a corresponding channel in the first area 301, or may be displayed at least partially overlapping the live image LIV of the corresponding channel.

FIG. 8 is an embodiment in which an event image is reproduced by selecting the reproduction menu 3023 of the event window 3021 by a user. In another embodiment, the event image may be automatically reproduced according to a user setting condition without selecting the reproduction menu 3023.

If automatic reproduction is set for a specific event by a user, when a specific event is detected, the processor 201 automatically displays the pop-up window 3025 around (e.g., in a location adjacent to the live image LIV) or overlapping the live image LIV of a channel in which an event is detected, as shown in FIG. 10, and an event image may be automatically reproduced. At the same time, the processor 201 may generate and provide the event window 3021 for a specific event detected from the second area 303.

If automatic reproduction is set for a specific event by a user, when an event is detected from a specific channel, the processor 201 automatically displays the pop-up window 3025 around (e.g., in a location adjacent to the live image LIV) or overlapping the live image LIV of the specific channel, as shown in FIG. 10, and an event image of the detected event may be automatically reproduced. At the same time, the processor 201 may generate and provide the event window 3021 for the detected event in the second area 303.

Figure 11:
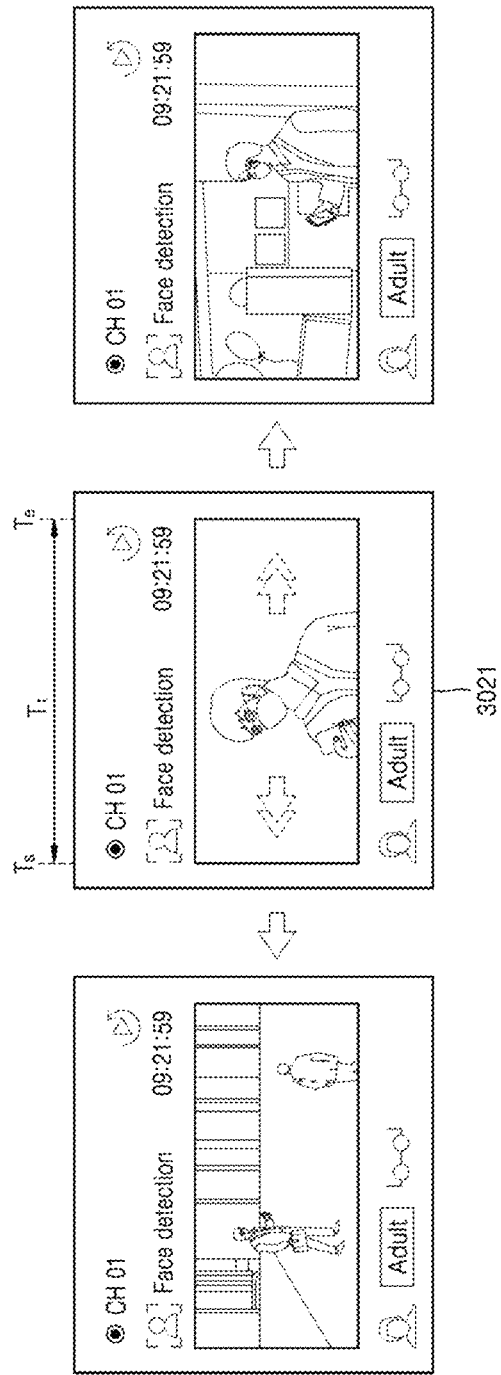
FIG. 11 is a view for explaining reproduction of an event image according to an embodiment.

FIG. 11 is a view for explaining reproduction of an event image according to an embodiment.

Referring to FIG. 11, when left sliding of an input device such as a mouse is detected from the event window 3021, the processor 201 may control the event image to be reproduced backwards, and when right sliding is detected, may control the event image to be reproduced forward.

A reproduction time of the event image may be determined according to a sliding distance to the left or right in a representative image of the event window 3021. For example, a horizontal length of an image window provided with the representative image in the event window 3021 may correspond to the total reproduction time (Tt=Te−Ts) of the event image, a central location of the image window may correspond to a midpoint of the event image, and a left end and a right end of the image window in a horizontal direction may correspond to a start point Ts and an end point Te of the event image, respectively.

FIGS. 12A to 13B are views illustrating an event providing method according to an embodiment. FIGS. 12A to 13B are embodiments in which an event image that occurred in the past is synthesized and displayed on a live image.

Figure 12A:
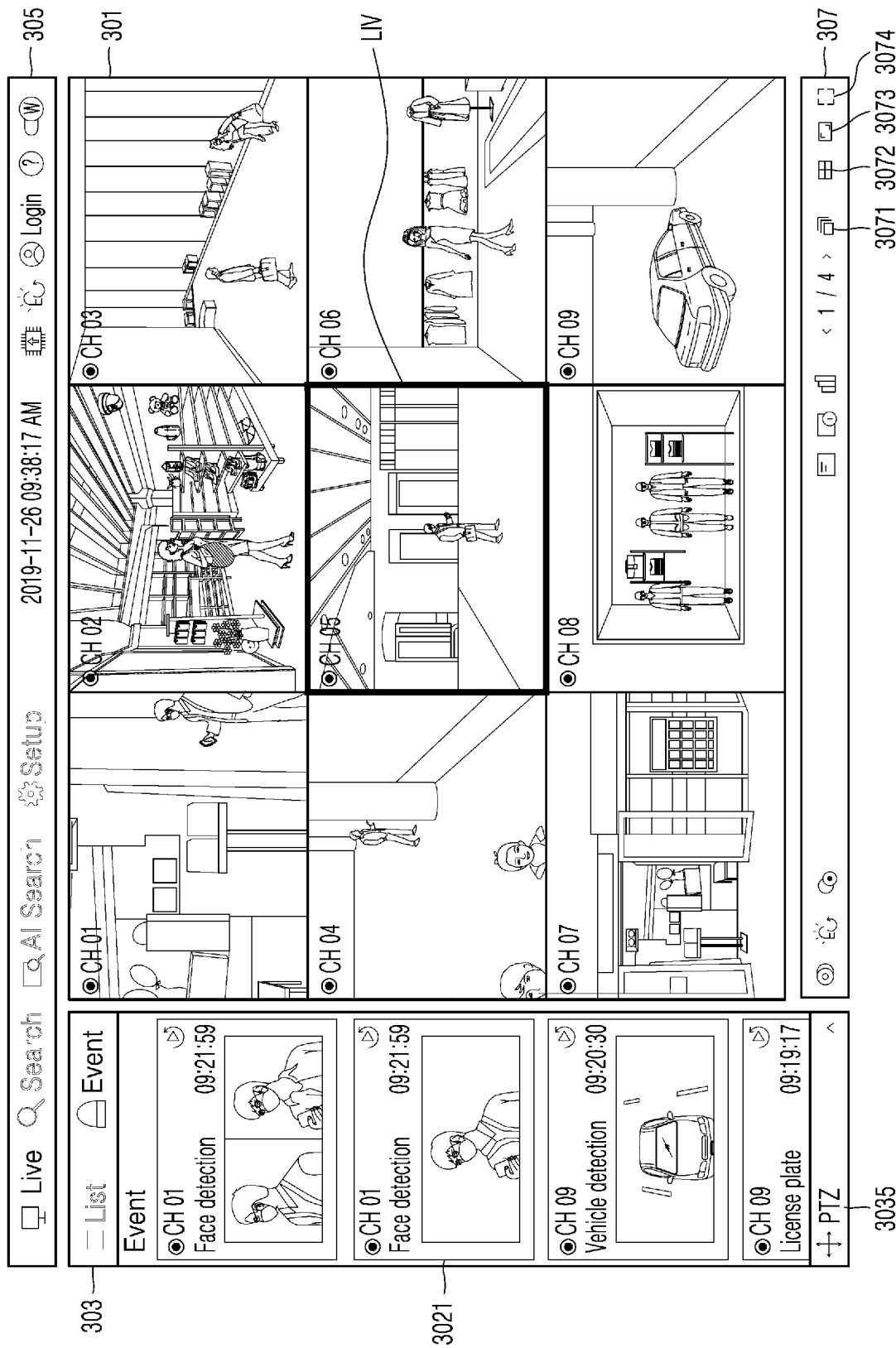
Figure 12B:
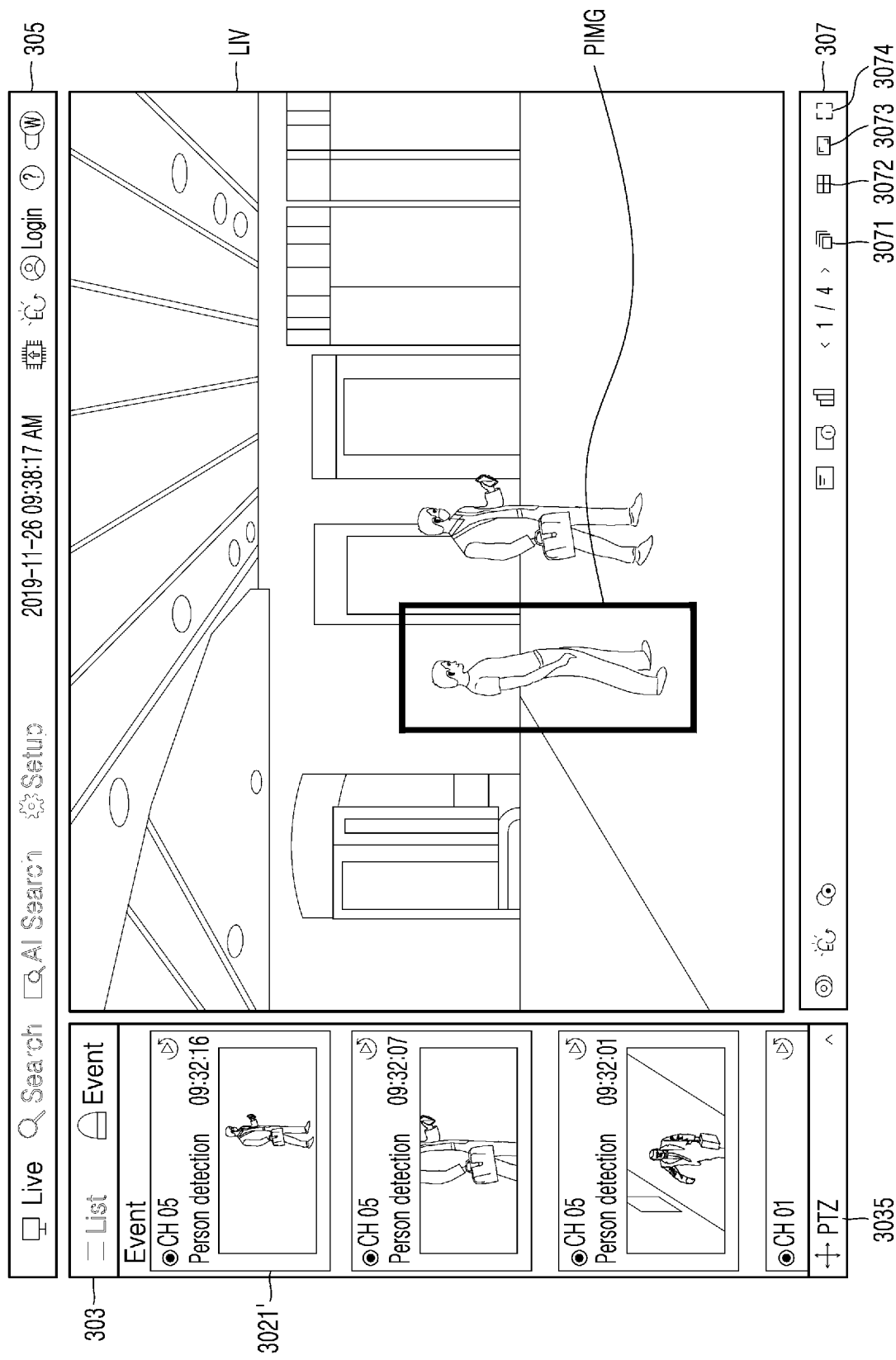

As shown in FIG. 12A, when a user-specified event occurs while live images of a plurality of channels are respectively displayed in the first area 301, the processor 201 may generate an event image of an event occurrence channel and an event window 3021' associated with the event image and may provide the event window 3021' in the second area 303 as shown in FIG. 12B. At the same time, the processor 201 may change a layout of the first area 301 so that the live image LIV of the event occurrence channel is entirely displayed in an enlarged manner in the first area 301. FIG. 12A is an example in which a user-specified event is a specific object detection or a specific face detection.

The processor 201 may check a past occurrence history of the user-specified event, and may synthesize and display a past image PIMG generated by occurrence of the user-specified event in the past with the live image LIV that is currently being reproduced.

The past image PIMG may be an image generated from a user-specified event detected in the past in the same channel or a different channel as a channel in which a current event occurred. In an embodiment, the past image PIMG may be a still image in which only an object is cropped from a representative image from among event images generated when a user-specified event is detected in the past. In another embodiment, the past image PIMG may be a reproducible event image (video) generated when a user-specified event is detected in the past. The past image PIMG may be repeatedly reproduced and displayed.

The past image PIMG may change to the same size as the size of an object related to an event in the live image LIV, and may be displayed at a location adjacent to the object. For example, as the size of an object increases in the live image LIV as the object moves in a direction closer to a camera, the past image PIMG may also move together with the object as the size increases.

Figure 13A:
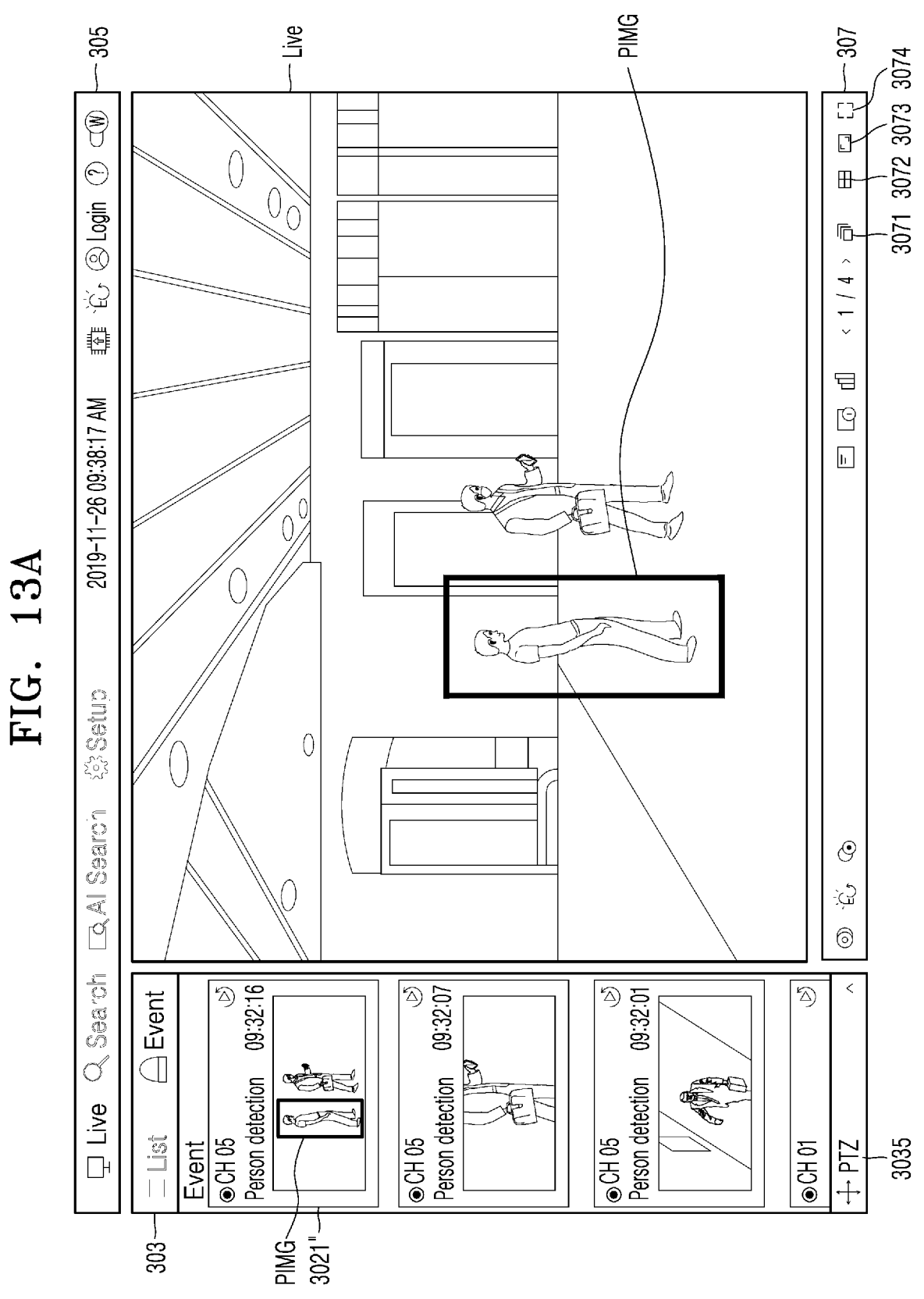
Figure 13B:
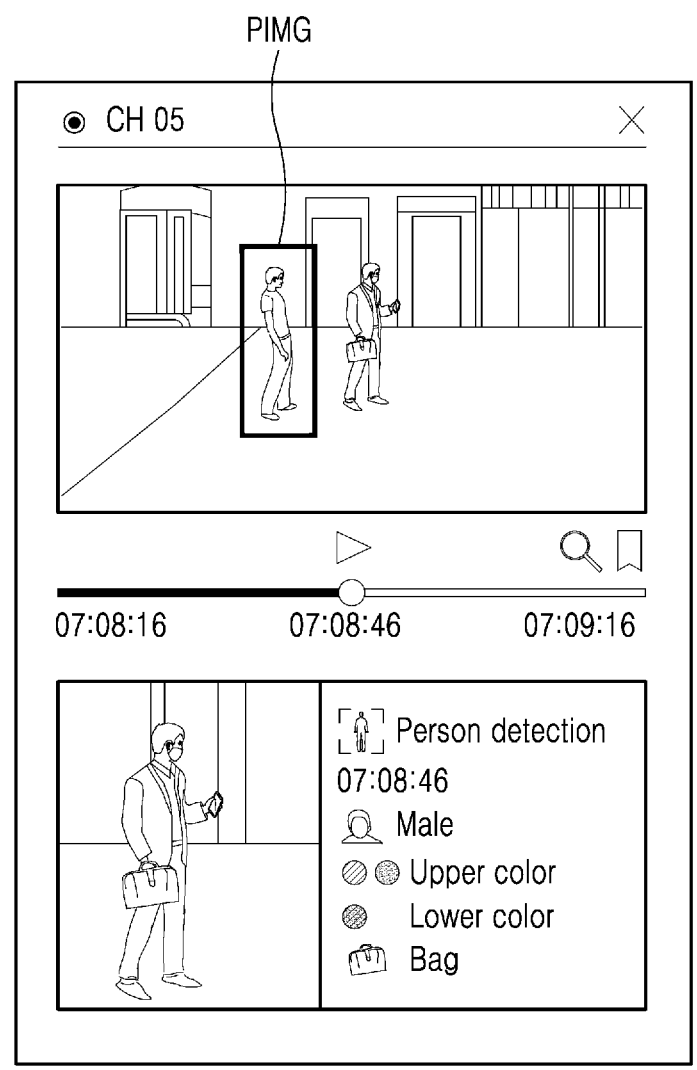

As shown in FIG. 13A, the past image PIMG may also be synthesized in a representative image generated in an event window 3021" of the second area 303. In addition, as shown in FIG. 13B, when a reproduction menu of the event window 3021" is selected, an event image in which the past image PIMG is synthesized may be reproduced. The past image PIMG displayed while the event image is being reproduced may be a still image in which only an object is cropped from a representative image from among event images or a reproducible event image (video).

The processor 202 may provide a set subsequent action when an event occurs. For example, when an event occurs, the processor 202 may initiate subsequent operations, such as sending an e-mail notifying the event, a visual/auditory notification, starting recording, sending a mobile push message, and a PTZ operation of a camera to the location of the event.

Figure 14A:
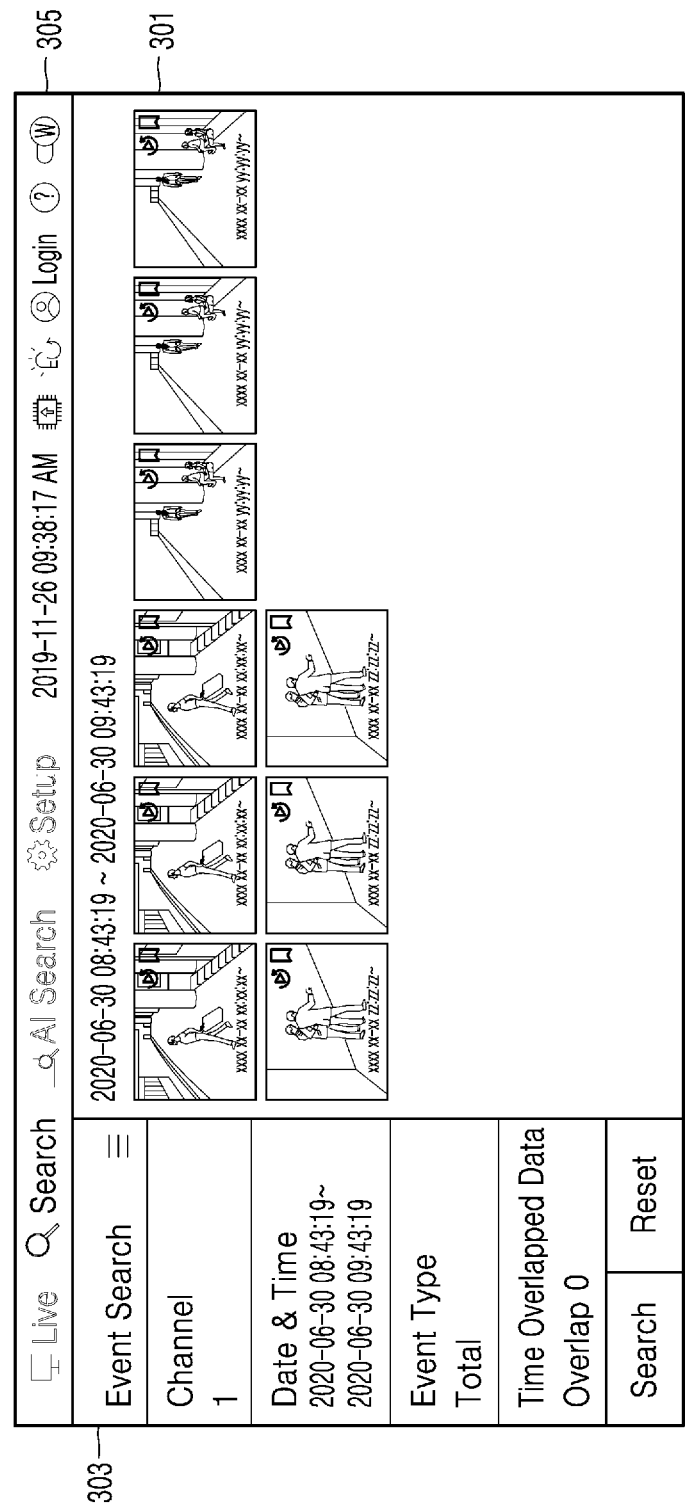
Figure 14B:
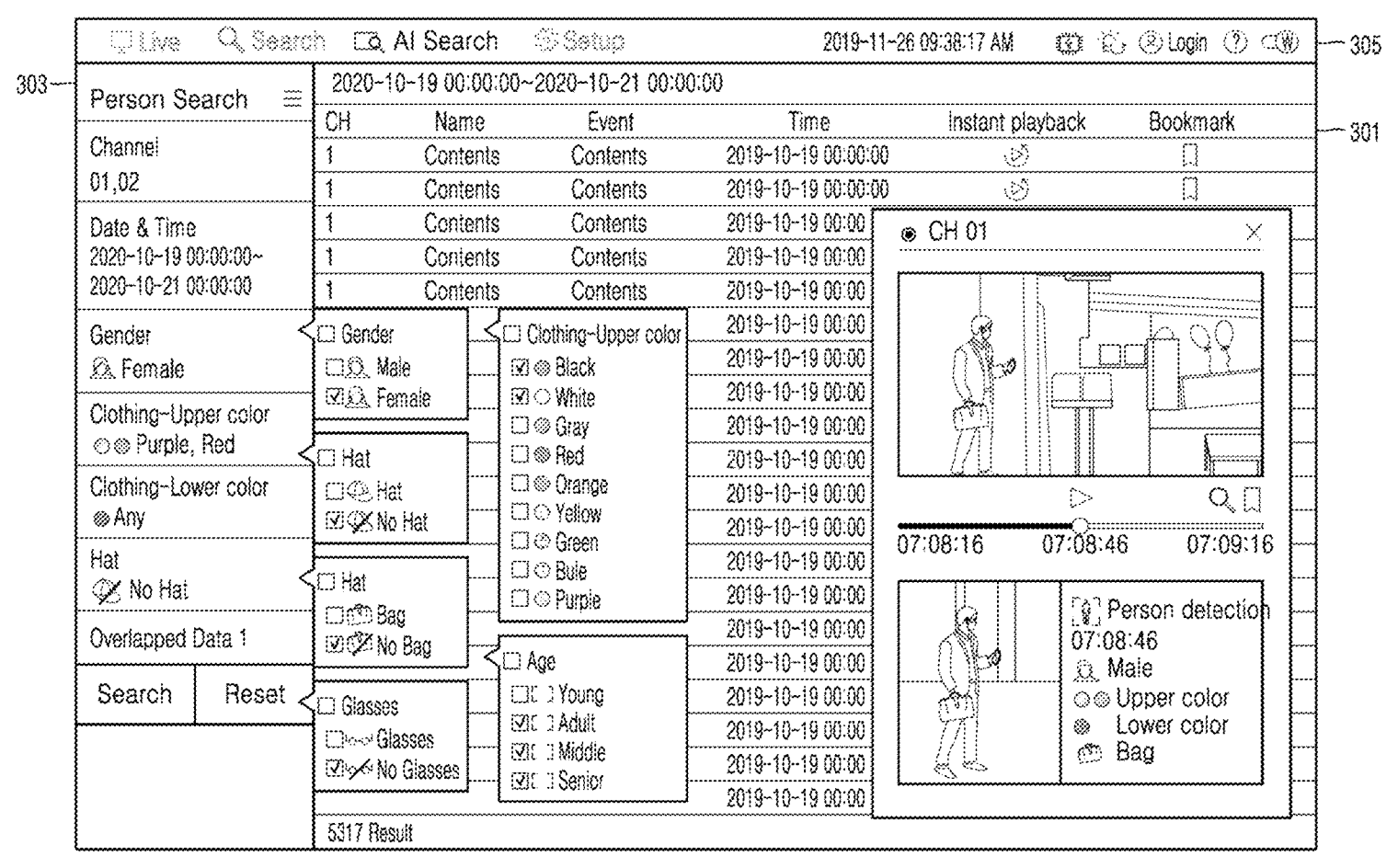
Figure 14C:
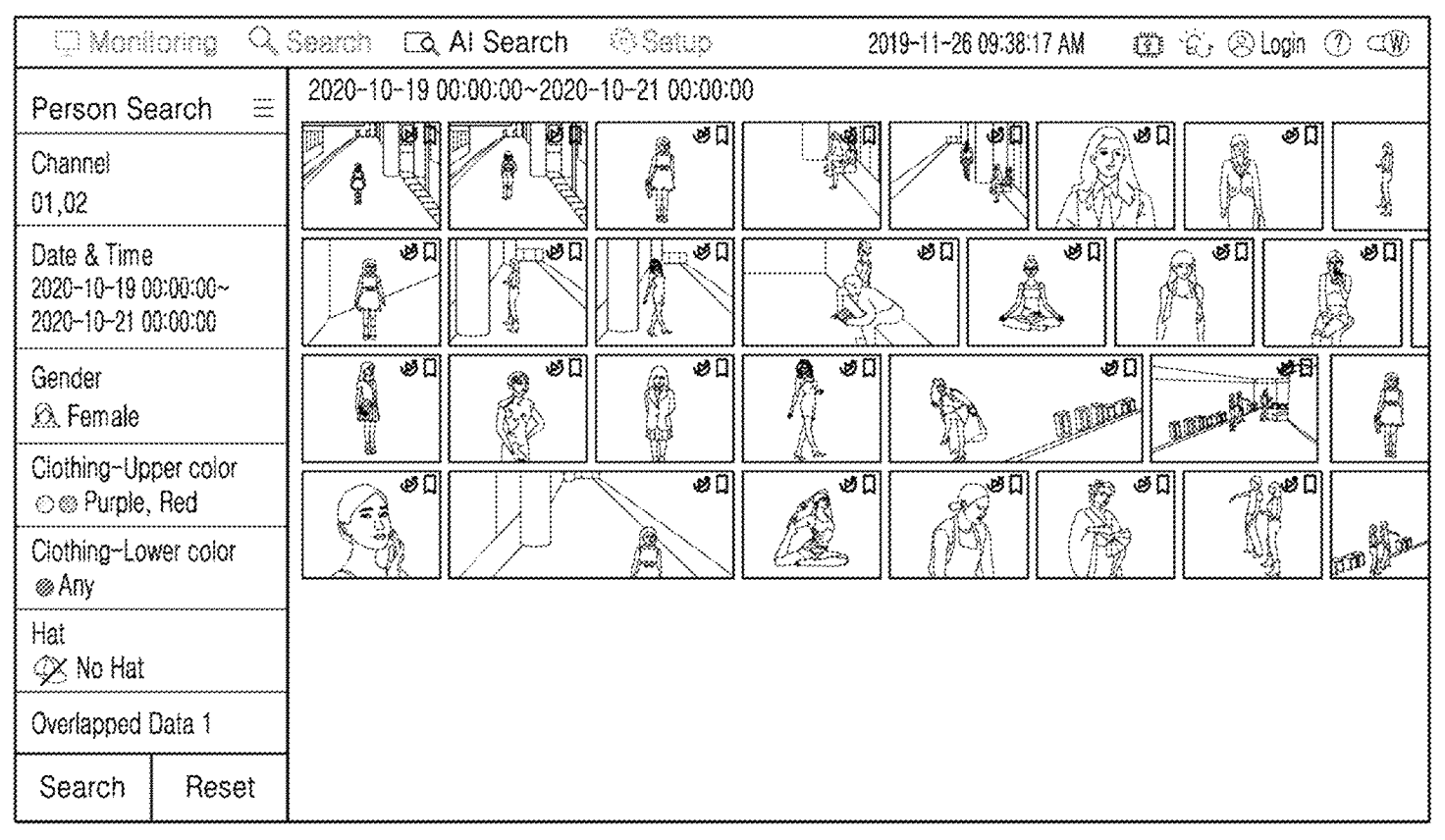

FIGS. 14A to 14C are views for explaining an image search according to an embodiment.

The image search may include a general search and an AI search. The general search may be a search in which a search condition is set by selecting a channel to be searched, date and time, event type, and whether to search all data in the same time zone (time-overlapping data). The AI search may be a search in which a search condition is scalable by providing various keywords in addition to search conditions provided in the general search.

As shown in FIG. 14A, when a general search menu (Search) of the third area 305 is selected, a window for setting search conditions is provided in the second area 303, and a search result matching the search conditions set by a user may be provided in the first area 301. FIG. 14A illustrates an example in which event images are provided in the first area 301, but an index of the event images may be provided in the first area 301 as a list according to user settings.

As shown in FIGS. 14B and 14C, when an AI search menu (AI Search) of the third area 305 is selected, a window for setting search conditions is provided in the second area 303, and a search result matching the search conditions set by a user may be provided in the first area 301. In the case of the AI search, compared to the general search, search conditions may be set more precisely and more specifically by a combination of search keywords. Search keywords provided for the AI search may include attribute information extracted from an event image. Search keywords are updated whenever an event is detected, so that search options including search keywords provided during the AI search may be dynamically changed. As a search result, an index of event images may be provided as a list as shown in FIG. 14B, and event images may be provided as shown in FIG. 14C.

As shown in FIGS. 14A to 14C, when a search result is provided as a list or an image, a function to reproduce an event image and a bookmark function may be provided together. A user may immediately reproduce an event image by selecting a reproduction menu, and may register the event image by selecting a bookmark menu.

Embodiments of the disclosure provide a function of generating and real-time reproduction of an event image when an event is detected from images obtained from a plurality of channels, and provide a history of occurrence of a past event in association with a current occurrence, so that a user may quickly check the occurrence of an event.

An event providing method according to the disclosure may be implemented as computer-readable code on a computer-readable recording medium. The non-transitory computer-readable recording medium is any data storage device that can store data which can thereafter be read by a computer system. Examples of the non-transitory computer-readable recording medium include ROM, RAM, CD-ROMs, magnetic tapes, floppy disks, optical data storage devices, etc. The non-transitory computer-readable recording medium can also be distributed over network-coupled computer systems so that the computer-readable code is stored and executed in a distributive manner. In addition, functional programs, code, and code segments for implementing the disclosure may be easily inferred by programmers of ordinary skill in the art.

Embodiments of the disclosure include a security system capable of intuitively notifying a user of an event occurrence when an event occurs using a user interface.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. A monitoring apparatus comprising:
a processor which processes the plurality of images received from a plurality of channels each one of the plurality of images being respectively received from each one of the plurality of channels;
a user interface generated by the processor;
a storage device which stores the plurality of images;
a display which displays the user interface;
the user interface comprising a first area and a second area;
one of the plurality of images in which an event is detected being designated as a first image;
the first area displaying at least one of the plurality of images;
the processor generating an event image and a representative image from the first image;
the second area including an event window which displays the representative image;
the event window displaying attribute information extracted by analysis of the first image; and
wherein the processor enlarges and displays the first image over the entire first area in live, and in an area in the first image around a person or face detected in the first image, the processor synthesizes and displays past images of the same person or face.

2. The monitoring apparatus of claim 1, wherein the past image corresponds to a past event image from which the same person or face is detected or corresponds to a still image of a person or face extracted from the past event image.

3. The monitoring apparatus of claim 2, wherein size of the still image of the person or face varies in proportion to the size of the person or face detected from the first image.

4. A monitoring apparatus comprising:
a processor which processes a plurality of images received from a plurality of channels, each one of the plurality of images being respectively received from each one of the plurality of channels;
a user interface generated by the processor;
a storage device which stores the plurality of images;
a display which displays the user interface;
the user interface comprising a first area and a second area;
one of the plurality of images in which an event is detected being designated as a first image;
the first area displaying at least one of the plurality of images;
the processor generating an event image and a representative image from the first image;
the second area including an event window which displays the representative image generated from the first image;
the event window displaying attribute information extracted by analysis of the first image; and
wherein one of the plurality of images displayed in the first area in which hovering of an input device is detected is designated as a second image which is different from the representative image, wherein the processor provides, in the second image, a reproduction menu of the second image and a camera control menu of a channel providing the second image.

5. The monitoring apparatus of claim 4, wherein the processor automatically reproduces the event image, in the first area, near the first image.

6. The monitoring apparatus of claim 4, wherein the processor provides a reproduction menu in the event window, and reproduces the event image, in the first area, near the first image, in response to a selection of the reproduction menu.

7. The monitoring apparatus of claim 4, wherein the first image further corresponds to one of the plurality of images in which a preset event is detected.

8. The monitoring apparatus of claim 4, wherein the processor detects left or right sliding of an input device from the representative image of the event window and reproduces the event image backward or forward for a time period proportional to a length of the sliding.

9. The monitoring apparatus of claim 4, wherein the processor registers the attribute information as a search keyword, and dynamically changes and provides a search option including the search keyword in response to a search request.

10. A monitoring method of a monitoring apparatus, the monitoring method comprising:
receiving a plurality of images from a plurality of channels, wherein each one of the plurality of images is respectively received from each one of the plurality of channels;
designating a first image which correspond to one of the plurality of images in which an event is detected;
generating an event image and a representative image from the first image;
generating a user interface comprising a first area and a second area;

displaying in the first area, at least two of the plurality of images;

displaying in the second area, an event window which displays the representative image;

displaying in the event window, attribute information extracted by analysis of the first image; and automatically reproducing the event image, in the first area, near the first image which is one of the plurality of images which are simultaneously being displayed in the first area wherein the event is detected in the first image; and wherein the event image is not completely inside the first image.

11. A monitoring method of a monitoring apparatus, the monitoring method comprising:

receiving a plurality of images from a plurality of channels, wherein each one of the plurality of images is respectively received from each one of the plurality of channels;

designating a first image which correspond to one of the plurality of images in which an event is detected;

generating an event image and a representative image from the first image;

generating a user interface comprising a first area and a second area;

displaying in the first area, at least one of the plurality of images;

displaying in the second area, an event window which displays the representative image;

displaying in the event window, attribute information extracted by analysis of the first image;

providing a reproduction menu in the event window in the second area, and reproducing the event image, in the first area, near the first image which is one of the plurality of images displayed in the first area in which the event is detected, in response to selection of the reproduction menu; and wherein the event image is not completely inside the first image.

12. The monitoring method of claim 11, wherein the first image further corresponds to one of the plurality of images in which a preset event is detected.

13. The monitoring method of claim 11, further comprising:

providing a second image which corresponds to one of the plurality of images in which hovering of an input device is detected, and providing, in the second image, a reproduction menu of the second image and a camera control menu of a channel providing the second image.

14. The monitoring method of claim 11, further comprising:

detecting left or right sliding of the input device from the representative image of the event window, and reproducing the event image backward or forward for a time period proportional to a length of the sliding.

15. The monitoring method of claim 11, further comprising:

registering the attribute information as a search keyword, and dynamically changing and providing a search option including the search keyword in response to a search request.

* * * * *